Dec. 27, 1949     O. H. BANKER     2,492,831
DRIVE GEAR FOR HELICOPTERS
Filed July 5, 1943     4 Sheets-Sheet 1
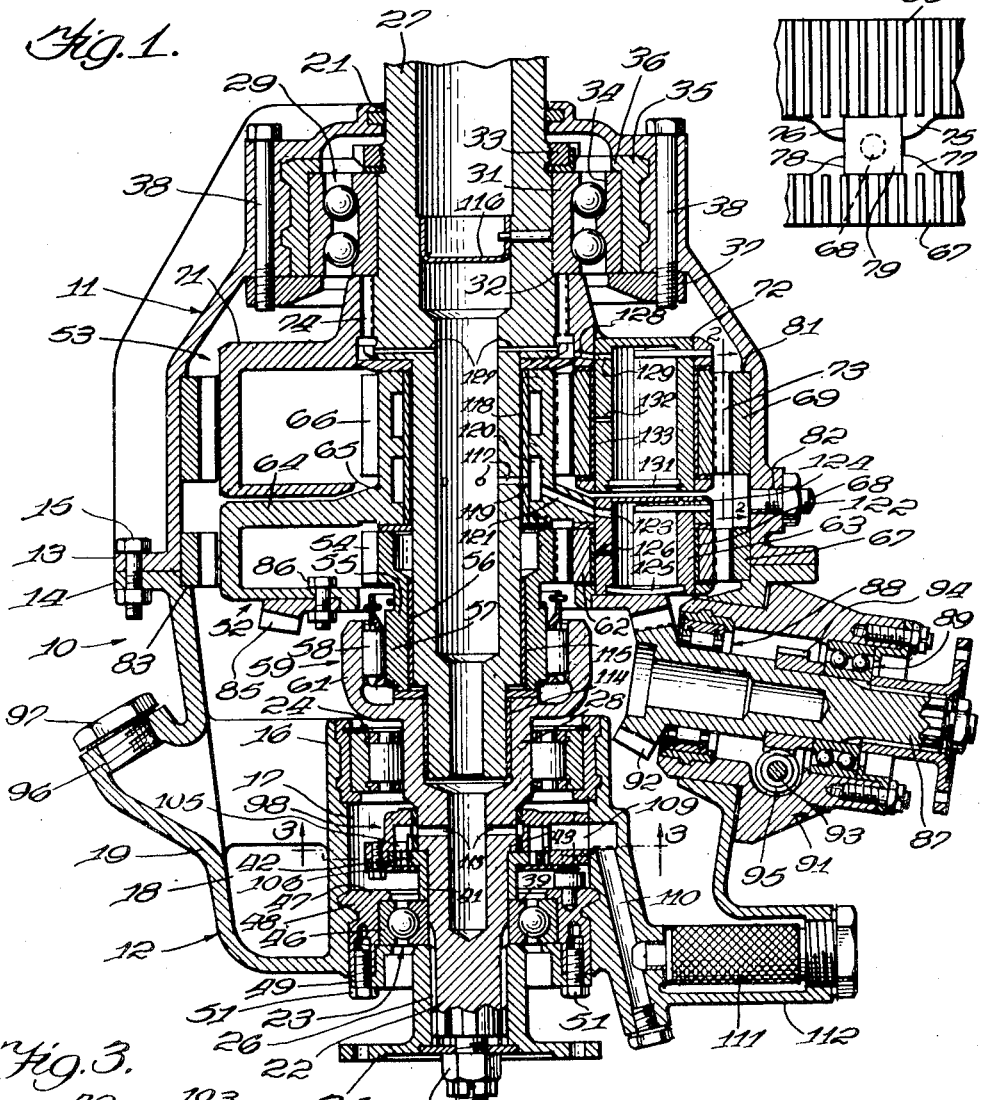
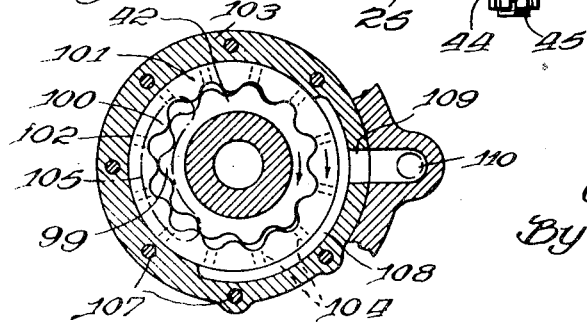
Inventor:
Oscar H. Banker
By Stone, Artman & Bisson
Attys.

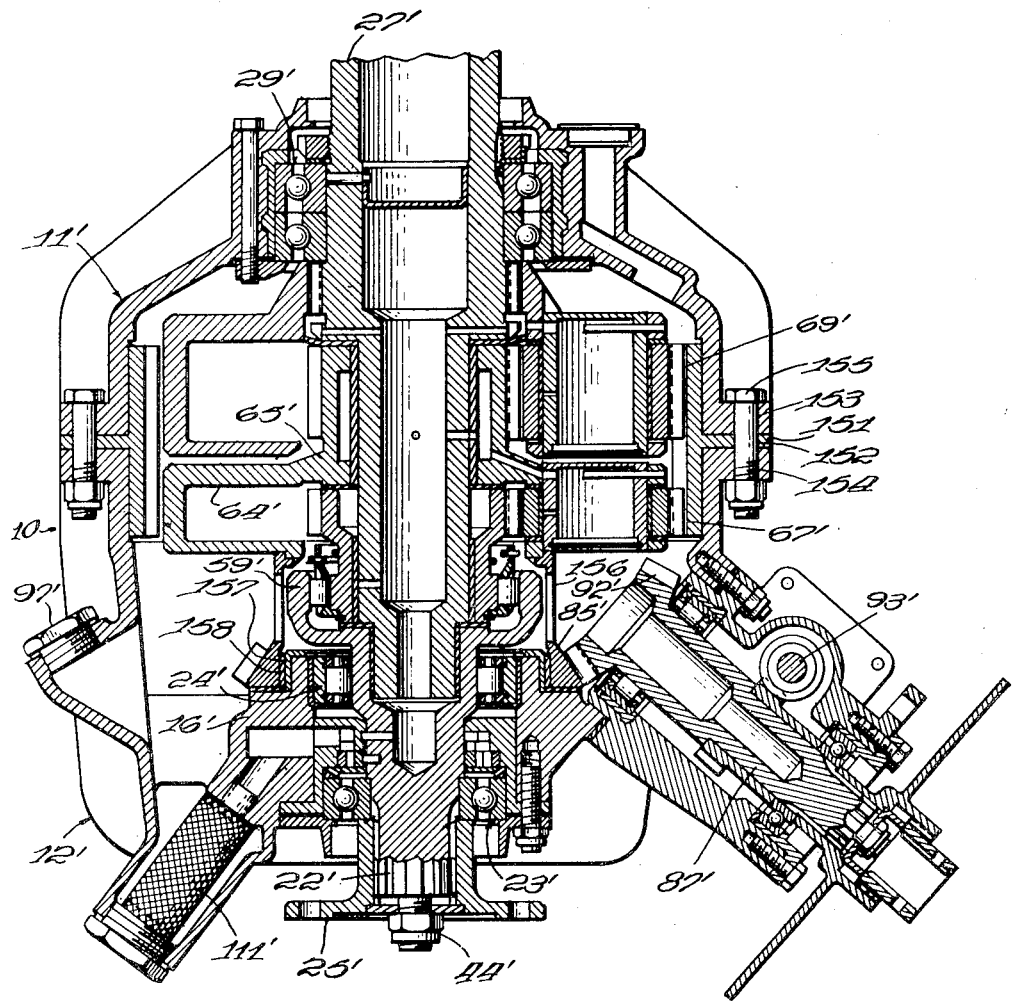

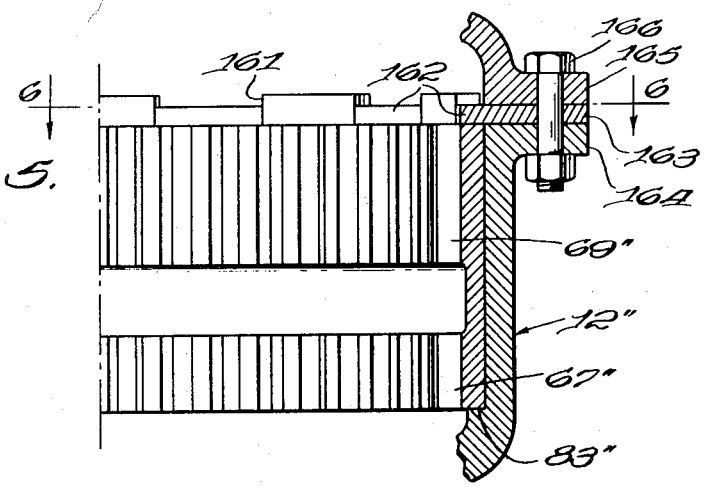
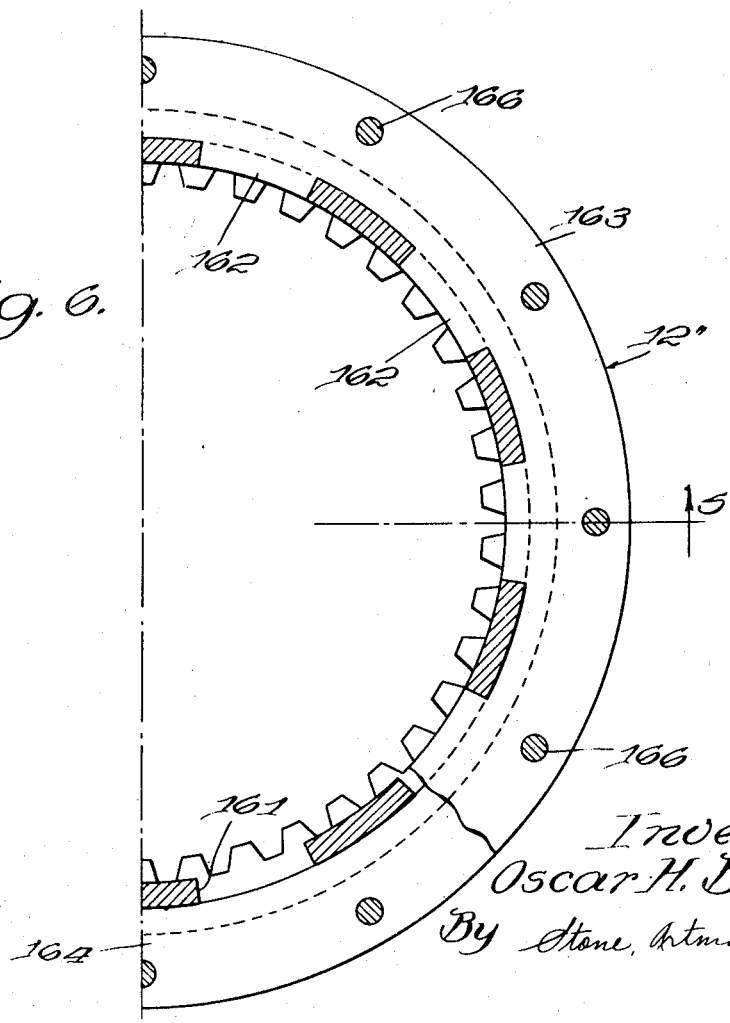

Dec. 27, 1949     O. H. BANKER     2,492,831
DRIVE GEAR FOR HELICOPTERS

Filed July 5, 1943     4 Sheets-Sheet 4

Inventor:
Oscar H. Banker
By Stone, Artman & Buun
Attys.

Patented Dec. 27, 1949

2,492,831

UNITED STATES PATENT OFFICE 2,492,831

DRIVE GEAR FOR HELICOPTERS

Oscar H. Banker, Evanston, Ill., assignor to New Products Corporation, Chicago, Ill., a corporation of Delaware Application July 5, 1943, Serial No. 493,501

11 Claims. (Cl. 74—801)

This invention has to do with a power transmission gear having features especially adapting the same for use in the transmission of driving force from the engine to the rotor and steering propellor of rotor-sustained aircraft.

An important object of the present invention is the provision of a lightweight speed reduction gearing employing an engine driven shaft in a coaxial piloted relation with a sustaining rotor shaft and wherein a portion of the sustaining rotor drive shaft between its piloted connection with the drive shaft and a bearing therefor in a casing for the gearing serves as a bearing support for planetary gearing disposed in driving relation between the shafts. This arrangement has the advantage of utilizing an inwardly projecting part of the sustaining rotor drive shaft for laterally stabilizing the same as well as providing the necessary support for parts of the drive gearing, and in this manner lateral support for the driven shaft in the form of an outboard bearing upon the casing is unnecessary. The weight is thereby eliminated both in reducing the size of the casing and in the minimizing of the number of bearings.

Another object of the invention is the provision of a drive gear casing of lightweight metal in combination with an improved means for securing a ring gear of a planetary gear unit thereto.

A further object is the provision of an improved drive gear casing for the reception of an upright shaft extending inwardly through the bottom of the casing, and including a re-entrant portion about said shaft for holding bearing means in which the shaft is journalled and for forming an annular oil sump in the bottom of the casing.

Another object is the provision of an improved casing having a bottom re-entrant section forming a bearing opening wherein there are axially spaced bearings for the support of a shaft, and a gear pump disposed within the space between the bearing units and having an element secured to and rotatable with the shaft for operating said gear pump.

A further object of the invention is the provision of an improved lightweight gearing employing drive and driven shafts in coaxial relation and a set of serially connected planetary gear units arranged coaxially about one of said shafts and wherein the carrier of one of said units drives the sun gear of the other and said carrier and sun gear being formed integrally to minimize weight.

An additional object of the invention is the provision of an improved arrangement of an overrunning clutch disposed in driving relation between a drive shaft and the sun gear of a planetary gear unit employed for driving a driven shaft from the drive shaft, and the sun gear and a portion of said overrunning clutch being formed integrally.

Still a further object is the provision of an improved bevelled gear and pinion arrangement for driving a steering propeller power-take-off shaft from the carrier of a planetary gear unit disposed in driving relation between the engine driven shaft and the sustaining rotor drive shaft of a driving gear, whereby the size of said pinion is reasonably small and is serviceable to drive said power-take-off shaft at substantially the same speed as the engine driven shaft.

Still a further object is the provision of a unique mounting for and disposition of an oil pump in combination with the shafting and casing of the drive gear unit.

These and other desirable objects inherent in and encompassed by the invention will be more readily understood upon reading the ensuing description with reference to the annexed drawings wherein:

Fig. 1 is a sectional view taken vertically and centrally through a drive gear constructed according to the principles of the invention;

Fig. 2 is a fragmentary view illustrating the manner of attaching and assembling ring gears with the drive gear casing, the view being taken as indicated by the line 2—2 in Fig. 1;

Fig. 3 is a horizontal sectional view taken on the line 3—3 of Fig. 1, showing the arrangement of gears within an oil pump employed in the device;

Fig. 4 is a view taken similarly to Fig. 1 through a modified form of drive gear;

Fig. 5 is a fragmentary sectional view taken on a vertical plane through a drive gear casing, illustrating a modified assembly of the ring gear structure and the casing;

Fig. 6 is a horizontal sectional view taken on the line 6—6 of Fig. 5;

Figure 7:
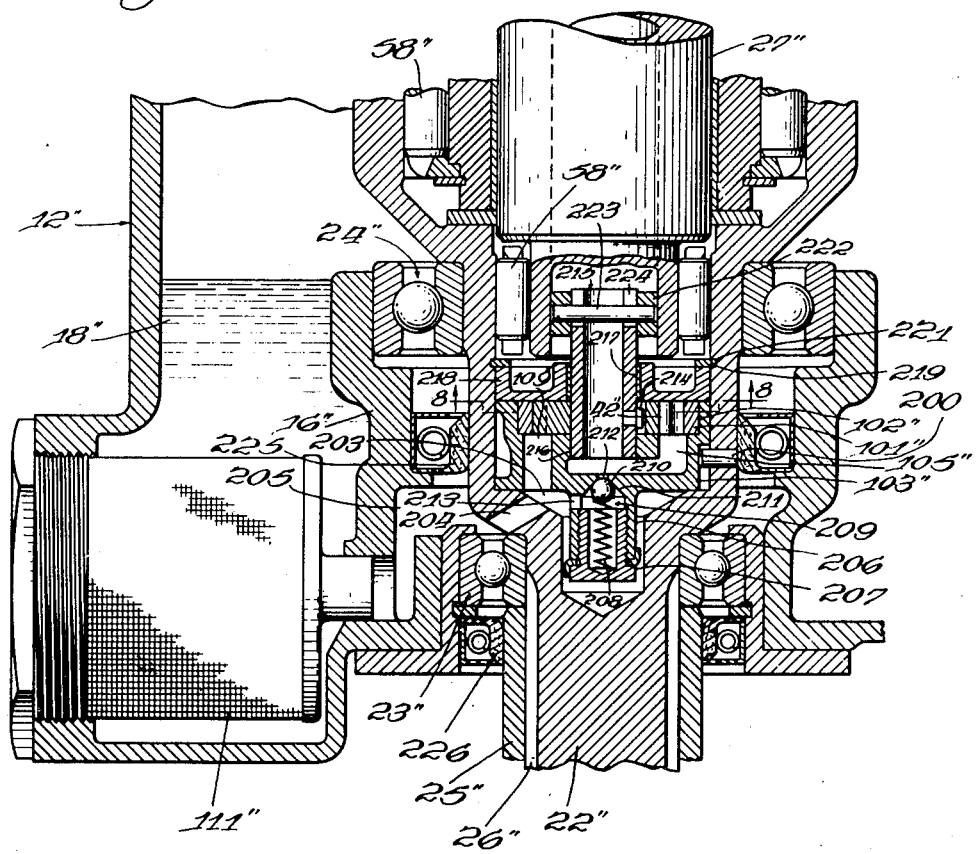
Fig. 7 is a vertical fragmentary sectional view taken through the sump portion of a casing and taken likewise through a novel oil pump installation contained within the upper end of the drive shaft and disposed below the lower end of the driven shaft.

With continued reference to the drawings and particularly to Fig. 1, a preferred form of the invention there shown comprises a casing 10 having an upper half 11 and a lower half 12, which halves include peripheral flanges 13 and 14 secured together by a plurality of circumferentially spaced bolts 15 of which one is shown in the drawing. The lower half of the casing has an upwardly turned re-entrant section 16 about an opening 17 and forming an annular oil sump 18 with the casing side wall 19. An opening 21 at the upper end of the casing upper half 11 is arranged coaxially with the opening 17.

A drive shaft 22 extends upwardly into the casing 10 through the opening 17 in which said shaft is journalled upon vertically spaced bearing units 23 and 24. A flanged coupling member 25 is splined to the drive shaft 22 at 26 and this flanged member 25 is to facilitate coupling of the drive shaft to the source of power such as the helicopter engine. A driven shaft 27, which is hollow to minimize weight extends downwardly into the casing 10 through the opening 21. The extreme lower end of the driven shaft 21 is piloted within a hollow portion 28 of the drive shaft whereas that portion of the driven shaft just inside of the opening 21 is journalled within a ball bearing unit 29. By piloting the lower end of the driven shaft 27 in the section 28 of the drive shaft which is spaced a considerable distance below the bearing unit 29, sufficient lateral stabilization for the driven shaft is obtained without extending a portion of the gear casing upwardly for carrying a stabilizing bearing unit spacedly above the bearing unit 29. This expedient of carrying the driven shaft in the vertically spaced bearing unit 29 and the pilot bearing 28 in the drive shaft contributes to the compactness of the device and minimizes its weight.

Since the driven shaft 27, when the device is installed upon a helicopter type of aircraft, will carry the sustaining rotor for such craft an endwise downward thrust will be imparted to this shaft by the rotor when the craft is at rest, whereas an upward thrust will be imparted to the shaft during operation of the rotor for lifting the craft. Therefore, the bearing unit 29 is installed in such a manner between the shaft 27 and the casing as to withstand extreme end thrusts upon the shaft in either direction. The inner race 31 of the bearing unit 29 is fixed against endwise movement upon the shaft 27 by means of a shoulder 32 thereon and a nut 33. The outer race 34 of said bearing unit is carried in a ring 35 which has a flange 36 in abutment with the upper end of the casing and against which the upper end of said race is held by a clamping ring 37 which is secured in place by bolts 38.

The drive shaft 22 is similarly held against axial movement within the casing by the bearing unit 23 of which the inner race 39 is clamped onto said shaft between a hub portion 41 of a pump gear 42 (later to be described) and the hub of the coupling member 25. A shoulder 43 on the drive shaft serves as an abutment against which the parts 25, 39 and 42 are pressed by a nut 44 when the latter is turned onto a threaded end portion 45 of the drive shaft. Axial movement of the outer race 46 of the bearing unit 23 is prevented by a flange 47 on a ring 48 which is axially fixed in the re-entrant portion 16 of the casing and by means of a ring 49 which is secured to the ring 48 by cap bolts 51.

Gearing employed between the drive shaft and the driven shaft consists of two planetary gear units generally respectively designated 52 and 53 which are connected in series driving relation. The lowermost of these planetary gear units comprises a sun gear 54 arranged coaxially with the drive and driven shafts and having a hub extension 55 journalled at 56 upon a section of the driven shaft 27. This extension 55 of the sun gear 54 is made in the form of a roller actuator 57 for the rollers 58 of an overrunning clutch 59 which also comprises the usual ring 61, formed integrally with the drive shaft, against which the rollers 58 are wedgeable in frictional driving relation by said actuator member when it is rotated in one direction. In the present instance it may be assumed, for example, the actuator member 57 is so formed as to cause the rollers 58 to wedge into frictional driving relation with the ring 61 when said ring tends to rotate counter-clockwise with respect to said actuator member, as viewed from an observation point below Fig. 1. Clockwise rotational tendencies of the ring 61 can occur without incurring wedging of the rollers and relatively to said actuator member and therefore without imparting driving force to the sun gear 54. It follows that the sun gear 54 may rotate counter-clockwise as viewed from below relatively to the ring 61 while overrunning the overrunning clutch 59, and this condition is desirable to have prevail in such an instance as when the engine may cease operating while the craft is in flight wherefore the sustaining rotor can "windmill" for causing the craft to descend at a non-precipitous rate.

The sun gear 54 of the lower planetary gear unit meshes with a plurality of planet gears 62, of which one is shown in Fig. 1, distributed circumferentially thereabout in the usual manner and journalled upon hollow bearing members 63 disposed upon and revolvable about the axis of a carrier 64. The hub 65 of the carrier 64 is formed integrally with a sun gear 66 of the planetary gear unit 53 which is also journalled upon the driven shaft 27. The planet gears 62 mesh with a ring gear 67 which is secured to the casing by a plurality of circumferentially spaced bolts 68. These bolts 68 also serve to secure a ring gear 69 of the planetary gear unit 53 to the casing in a manner presently described in detail.

The carrier 71 of the upper planetary gear unit has circumferentially spaced hollow bearing members 72 similar to the bearing members 63, and the planet gears 73 of this upper planetary gear unit respectively journalled on said bearing members mutually mesh with the sun gear 66 and said ring gear 69. The carrier 71 is splined to the driven shaft 27 as indicated at 74.

The lower edge of the upper ring gear 69 has a plurality of circumferentially spaced bosses 75, one being shown in Fig. 2, of which each has a notch 76. Similar bosses 77 are formed on the upper edge of the ring gear 67 and contain notches 78. These notches 76 and 78 have the same width as do square heads 79 on the bolts 68. Before assembling the upper half of the casing with the lower half, the ring gear 69 will be inserted into the casing upper half 11 sufficiently far to place the upper edge of said gear against a shoulder 81 of said casing upper half. The gear will be so rotatively positioned as to bring its notches 76 into respective registry with holes 82 in such casing upper half for the bolts 68. The width of the bolt heads 79 are so chosen that when the bolts are inserted through the holes 82 the upper edges of their heads will fit snugly against the ceilings of the notches 76 for retaining the gear firmly against the casing shoulder 81. The ring gear 67 is so rotatively disposed within the casing lower half 12 against a shoulder 83 thereon that the notches 78 will register with the bolt heads 79 when the upper casing half with which the ring gear 69 and bolts 68 have been assembled is carried into assembly with the casing lower half, the lower sides of the bolt heads 79 will drop into the notches 78. The lower edges of the bolt heads 79, upon the tightening of the casing bolts 15, serve to press the lower edge of the ring gear 67 against the casing shoulder 83. Therefore, the bolt heads 79 cooperate with the shoulders 81 and 83 of the assembled casing in preventing axial displacement of the ring gears 67 and 69, and these bolt heads cooperate with the notched bosses 75 and 77 on the ring gears for preventing rotation of these gears. In the operation of the gearing so far described, clockwise rotation, as viewed from below, will be imparted to the drive shaft 22 from the aircraft engine. This shaft rotates freely in the bearing units 23 and 24. Rotative force is imparted to the lower sun gear 54 through the overrunning clutch 59, and this rotation of the sun gear 54 causes planetary movement of the planet gears 62 meshed therewith while they react against the fixed ring gear 67. Thus the primary carrier 64 is caused to rotate at a reduced speed with respect to the drive shaft and the sun gear 54. The secondary sun gear 66 which is formed integrally with the carrier 64 will therefore likewise rotate at a reduced speed and will cause planetary movement of the planet gears 73 meshed therewith while they react against the fixed ring gear of the secondary planetary gear unit. Thus the secondary carrier 71 and the driven shaft 27 splined thereto are caused to rotate at a further reduced speed with respect to the driving shaft.

A power take off for driving the steering and stabilizing propeller of a helicopter upon which the device is adapted to be installed receives driving force from a bevelled gear 85 which is secured by bolts 86 to and for rotation with the primary planet gear carrier 64. A power take off shaft 87 is journalled within axially spaced bearing units 88 and 89 in an outboard section 91 of the casing, and the inner end of this shaft 87 has formed thereon a bevelled pinion 92 which meshes with the bevelled gear 85. A tachometer drive shaft 93 is adapted to be driven from the power take off shaft 87 through a worm gear 94 and a worm pinion 95 respectively fixed to the shafts 87 and 93.

It is desirable that the power take off shaft 87 for supplying driving force for the steering propeller of the helicopter rotate at substantially the same speed as the drive shaft 22. Normally the substantially one-to-one driving speed ratio of the shafts 22 and 87 could be obtained by means of moderately sized bevelled gears of the same diameter meshed with one another and fixed respectively upon these shafts. However, because of the drive shaft 22 being encased within the re-entrant portion 16 of the casing and because of the upper end portion thereof being enlarged to form the ring for the overrunning clutch 59, a driving bevelled gear upon the accessible portion of the drive shaft would have to be quite large and thereby require a correspondingly and prohibitively large driven pinion corresponding to the pinion 92. In the present embodiment the moderate sized driven pinion 92 is operable to drive the power take off shaft 87 at the desired speed by employing the expedient of stepping down the speed of the bevelled gear 85 which drives the same, this speed reduction of the drive pinion 85 being obtained through the primary planetary gear unit 52. The speed of the driven pinion 92 is stepped back up to the desired speed for the shaft 87 by reducing the diameter of said pinion 92 with respect to the diameter of the drive gear 85. In other words, there is a speed reduction to the large diameter drive gear 85 and a speed step up from the more slowly rotating gear 85 to and through the moderately sized bevelled pinion 92 whereby the power take off shaft 87 is caused to rotate at the desired speed.

Connecting the steering propeller shaft 87 with the sustaining rotor shaft 27 above the overrunning clutch 59 provides for these two shafts always being drivingly connected whereby in case of engine failure the steering propeller shaft will be driven by force derived from the sustaining rotor of the descending craft. Therefore, the dirigible feature of the craft will be preserved for use in an emergency landing.

The lubricating oil for the device is poured into the sump 18 through a casing opening 96 normally closed by a screw plug 97, it being understood that the drive gear unit operates in the upright position shown in Fig. 1, with the sump 18 at the bottom. This oil is forced to strategic bearing surfaces of the device by a pump 98 which is disposed about the drive shaft within the space provided therefor between the drive shaft bearing units 23 and 24. Referring concurrently to Figs. 1 and 3 the pump 98 will be seen to include the aforesaid pinion gear 42 fixed to and for rotation with the drive shaft 22. This pinion gear has lobe-like teeth 99 which are meshable with lobe-like internal teeth 100 upon a gear 101 which is arranged eccentrically with respect to the gear 42. The gear 101 has a circular outer surface 102 journalled within the pump casing 103 and has radial ports 104 which communicate between said circular surface 102 and the internal spaces between the teeth 100. A portion of the casing 103 lies flatly over the upper end faces of the pump gears 42 and 101 excepting for a discharge port 105 shown in full lines in Fig. 1 and indicated by dot-dash lines in Fig. 3. The bottom faces of the pump gears are engaged and sealed by an annular bottom plate 106 secured to the casing by bolts 107. An inlet passage 108 communicates with the outer ends of the radial passages of the driven gear 101 during a portion of the rotation of said gear 101. This inlet channel 108 communicates with the gear casing sump 18 through a radial passage 109 in the pump casing 103, a channel 110 in the lower half 12 of the gear casing, and a filter member 111 removably contained in a bottom section 112 of said casing as 12.

During rotation of the drive shaft 22 in the clockwise direction as viewed from below, the pump gears 42 and 101 will be caused to rotate in the direction of the arrows shown thereon in Fig. 3, the gear 42 driving the gear 101 while the latter rotates eccentrically thereof within the casing 103. While the pump gear teeth traverse that portion of their rotative paths which is in radial registry with that portion of the intake channel 108 between the channel 109 and the lower left end of said channel 108 as viewed in Fig. 3, the space between the teeth on the gears will be increasing thereby increasing the volume of the space contained therebetween so that the suction occurs drawing oil through the filter member 111 and upwardly through the channel 110, and inwardly through the channels 109 and 108 and through the radial passages 104 into the space between the toothed portions of the gears. As these filled spaces between the gears traverse that portion of their path which is in registry with the casing port 105, the space will be contracted to force the oil from between the gears upwardly into the port 105 and thence radially inwardly through holes 113 in the drive shaft and thence into the hollow portion of said drive shaft.

Part of the oil thus forced into the hollow drive shaft under pressure is forced upwardly for lubricating the bearing sleeves 114 and 115 respectively between the lower piloted end of the driven shaft and drive shaft and the driven shaft and the overrunning clutch actuator 57. This oil will leak outwardly from the upper end of the sun gear 54 and thence back into the casing reservoir. Some of the pumped oil will be forced upwardly through the hollow portion of the driven shaft 27 where it is maintained under pressure by a closure cup 116 and thus forced radially outwardly through radial holes 117 in said shaft. Oil forced through the holes 117 lubricates a bearing sleeve 118 for the common hub of the primary carrier 64 and the secondary sun gear 66. Some of the oil is forced outwardly through holes (not shown in the bearing sleeve 118) and thence through holes 119 (one being shown) in the hub of the carrier 64 and into an annular passage 120 from which radial channels 121 extend (one channel being shown) respectively to the hollow shafts 63 for the planet gears 62, for lubricating bearing sleeves 122 between these shafts and their respective planet gears. The oil is introduced into the hollow shafts 63 from the channels 121 through holes 123 and is trapped under pressure within these shafts by integral end walls 124 at one end thereof and closure caps 125 at their other ends. This oil reaches the bearing sleeves 122 through radial passages 126 in the hollow shafts. The excess oil leaks from the ends of the bearing sleeves 122 back into the casing sump.

Additional radial passages, 127, in the driven shaft 27 conduct the oil radially outwardly for introduction into the hollow planet shafts 72 through radial passages 128 and 129. These planet shafts 72 have an integral upper end wall and a lower end cap 131 for closing their ends whereby the oil introduced thereinto may be forced outwardly under pressure through radial passages 132 for lubricating the planet bearing sleeves 133. The oil leaks endwise from these bearing sleeves and is thence thrown centrifugally into the casing where it ultimately drains back to the casing sump 18.

An important advantage of the ring gear mounting within the casing is that the ring gears 67 and 69 are adapted to be formed of hardenable steel while the casing is adapted to be made of a light weight metal, thereby minimizing the overall weight of the device which is an important factor in equipment for installation upon aircraft. Another important advantage which has to do with the reduction of weight is the utilization of the hollow upper end of the drive shaft for journal piloting of the lower end of the driven shaft and thereby cooperating with the upper bearing unit 29 in providing axially spaced stabilizing bearing supports for the driven shaft, making it unnecessary to extend the casing above the bearing unit 29 for the support of additional bearing means spaced from the bearing unit 29 for giving adequate stabilizing support for the driven shaft. That part of the driven shaft extending downwardly into the casing also provides journalling for the secondary sun gear 66 and the primary carrier 64 as well as for the primary sun gear 54 and the overrunning clutch actuator 57. This double use of the downwardly extending portion of the driven shaft 27, that is, its use as journal support for parts of the planetary gear units and stabilizing bearing means for said driven shaft, expediently utilizes the material used in the construction of the device so that its weight is desirably small. The weight factor is also affected favorably by making the secondary sun gear 66 integral with the primary carrier 64 and by making the primary sun gear 54 integral with the overrunning clutch actuator 57.

The second form of the invention shown in Fig. 4 is for the most part constructed like the above described first form, and to expedite this description those parts which are identical with or which substantially correspond to respective parts in the first form are simply designated by the same respective reference characters with the addition of a prime.

One difference in the second form of the invention is the integral construction of the primary and secondary ring gears 67' and 69'. This integral structure of the ring gears 67'—69' has an outwardly projecting radial flange 151 which is adapted to be clamped between the upper and lower halves 11' and 12' of the gear casing. Holes 152 in the flange 151 register with holes 153 and 154 in horizontal flange portions of the casing halves for the reception of bolts 155 which are adapted for holding these parts in rigid assembly.

Another difference of significance in this second form of the invention is the manner in which the bevelled gear 85' is attached to the primary carrier 64'. This bevelled gear 85' has an upwardly extending cylindrical portion 156 which is suitably attached to the carrier 64' while the bevelled gear proper is journalled upon the re-entrant lower wall portion 16' of the casing, there being bearing sleeves 157 and 158 interposed between the gear 85' and said casing re-entrant portion. This arrangement of the gear 85' relieves reactive force taken from the driven pinion 92' from the hub 65' of the primary carrier 64'. A more solid support is also provided by the re-entrant casing portion 16' for the bevelled gear 85'. Furthermore, the bevelled gear 85' is placed sufficiently far below the primary planetary gear unit to facilitate disposal of the driven pinion 92' above said gear 85', making possible a different and wider range of angular positions with which the power take off shaft 87' may be disposed with respect to the axes of the drive and driven shafts 22 and 27.

In Figs. 5 and 6 a still different form of ring gear structure and assembly thereof with the gear casing is shown. In this form the parts corresponding to those in Fig. 1 are designated by the same respective reference characters with the addition of a double prime. The integrally formed primary and secondary ring gears 67" and 69" rest upon a shoulder 83" in the lower casing half 12". The upper end of the integral gear structure 67"—69" is provided with a plurality of notches 161 which receive radial projections 162 extending radially inwardly from a ring 163 which is clamped between flanges 164 and 165 of the casing by means of bolts 166. The projections 162 in addition to preventing rotation of the ring gear unit 67''—69'' further serve cooperatively with the shoulder 83'' for preventing axial displacement of this integral gear structure.

Figure 8:
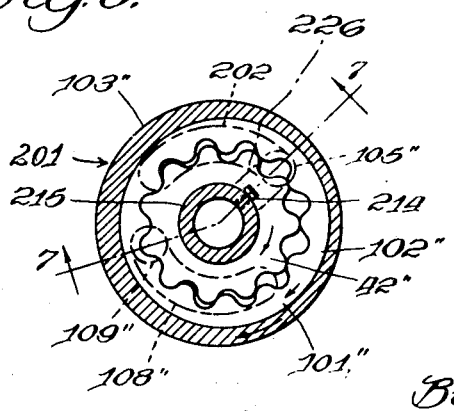
Fig. 8 is a plan view of the gears of the pump shown in Fig. 7.

A novel oil pump arrangement is shown in Figs. 7 and 8. The oil pump generally designated 201 is contained within the upper hollowed portion of a drive shaft 22'' in which the lower end of a driven shaft 27'' is piloted upon roller bearings 58''. Those parts just identified by the reference characters with the double prime correspond to parts shown in Fig. 1 identified by the same respective reference characters without the double prime. Other reference characters in Figs. 7 and 8 incorporating the double prime exponent have the same significance with respect to reference characters and parts designated thereby in Fig. 1. Thus the sump 18'' contains an oil filter 111'' through which oil is strained prior to being drawn into the pump 201.

Said pump 201 comprises lobed eccentrically journalled pinion and ring gears 42'' and 101'' corresponding to and cooperative similarly to the gears 42 and 101 in the Fig. 1 embodiment. A casing 103'' for the pump 201 is generally cup-shaped and has a cylindrical outer periphery. This casing 103'' is fitted into the hollow section of the drive shaft 22'' where rotation relatively thereto is prevented by a key 200. Inlet and outlet ports 109'' and 105'' are formed in the bottom of the casing 103'', the inner and upper ends of these ports leading respectively into the bottoms of arcuate recesses 108'' and 202. Inlet port 109'' as seen in Fig. 7 extends entirely downwardly through the casing member 103'' where it communicates with a space 203 between the bottom of the casing and the bottom of the hollow section in the drive shaft 22'' and thence continues communication through one or more radial passages 204 with an annular chamber 205 formed between oil seals 225 and 226 and the re-entrant portion 16'' of the casing 12''.

An internally threaded downwardly extending portion 206 of the casing 103'' contains a threaded plug 207 which forms a reaction member for one end of a spring 208 forming a part of a pressure relief valve 209 which also comprises a ball 210 urged against a ball seat 211 by said spring 208. When the ball 210 is held against the seat 211 pumped oil is precluded from escaping from the outlet port 105'' through a port 212 in said seat and thence through a second port 213 into the low pressure space 203. A circular bearing 102'' in the pump casing for the internally lobed gear 101'' is arranged eccentrically with respect to the transmission drive and driven shaft axes. The internally lobed gear 101'' is adapted to rotate freely within the bearing 102''. The lobed pinion gear 42'' is keyed at 214 to a hollow shaft 215 which is coaxial with the transmission shafts 22'' and 27'' and eccentric to the pump gear 101'' as shown in Fig. 8. Pinion shaft 215 is journalled in a bearing 216 in the pump casing 103'' and in a bearing 217 in an upper end plate 218 of such casing. This casing end plate 218 has a flat under side fitted in sliding sealed relation with the upper end faces of the pump gears and is retained in this position by a snap ring 219 expanded into a groove 221 in the transmission drive shaft. A ring 222 press-fitted in the lower end of the transmission driven shaft contains a shear pin 223 which is within a notch 224 across the upper end of the pump pinion shaft to constrain the pump pinion 42'' and said shaft, 215, for rotation with the transmission driven shaft. Thus the pump pinion is caused to rotate at a speed reduced with respect to the pump casing which rotates with the transmission drive shaft.

In the operation of this pump when the drive shaft 22'' and the pump casing rotate clockwise, as viewed in Fig. 8, the transmission driven shaft 27'', pump pinion shaft 215 and the pump pinion 42'' are also rotating clockwise but at a reduced speed wherefore the pump pinion is rotated counter-clockwise with respect to the pump casing. Since the pump pinion is meshed with the pump ring or rotor gear the latter will also be caused to rotate in its bearing 102'' counter-clockwise with respect to the pump casing. During this rotation of the pump gears counter-clockwise relatively to the pump casing the latter, while rotating eccentrically about the pump pinion axis, maintains the arcuate recesses 108'' and 202 and the inlet and outlet ports 109'' and 105'' oriented as shown in Fig. 8 with respect to the coincidence point of the pump gear tooth pitch circles. Therefore, as the pump teeth in rotating counterclockwise relatively to the casing traverse that portion of their paths in registry with the inlet recess 108'' the space between the pinion and rotor gear teeth will be expanding to suck oil into the pump from the sump 18'' through the filter 111'', annular chamber 205, holes 204, space 203, inlet port 109'', inlet recess 108'' and into such expanding space between the pump teeth. Subsequently as these pump teeth traverse that portion of their path in registry with the outlet recess 202 the pinion and rotor teeth are forced together, expelling the oil outwardly through the recess 202, and a radial lateral 226 thereof and thence upwardly through the hollow pinion shaft 215 from which it is discharged into the hollow transmission shaft 27'' for distribution to lubrication points in the transmission shafting and gearing. Should the discharged passages for the pumped oil become clogged, excessive pressure is prevented by the opening of the relief valve 209 and the escape of the oil into the low pressure space 203.

While I have herein shown and described but a limited number of embodiments of the invention, it will be understood that the invention extends to other embodiments, forms, modifications, structures and details falling within the scope and spirit thereof and not sacrificing all of its material advantages.

I claim:

1. In a helicopter drive gearing, a gear casing having a lower drive shaft bearing and an upper driven shaft bearing axially aligned with the drive shaft bearing, a drive shaft journalled in said drive shaft bearing, a driven shaft journalled in the driven shaft bearing and extending downwardly into piloted relation with the driven shaft, said driven shaft having a rotatable part bearing portion within said casing between the driven shaft bearing and the drive shaft, and means for establishing a driving connection between said shafts comprising a planetary gear unit including a sun gear journalled on said driven shaft bearing portion, a ring gear fixed to said casing, a carrier drivingly connected with the driven shaft and planet gears journalled on the carrier and meshed with the sun and ring gears, and an overrunning clutch arranged coaxially with and disposed in driving relation between said drive shaft and said sun gear.

2. In a helicopter drive gearing, a gear casing having a lower drive shaft bearing and an upper driven shaft bearing axially aligned with the drive shaft bearing, a drive shaft journalled in said drive shaft bearing, a driven shaft journalled in the driven shaft bearing and extending downwardly into piloted relation with the drive shaft, said driven shaft having a rotatable part bearing portion within said casing between the driven shaft bearing and the drive shaft, and means for establishing a driving connection between said shafts comprising a planetary gear unit including a pair of planetary gear units disposed in superposed relation about said driven shaft bearing portion, the lower of said units constituting a primary unit and the upper thereof a secondary unit, said units comprising respective sun gears journalled on the driven shaft bearing portion, respective ring gears fixed to the casing, respective sets of planet gears meshed with their associated sun and ring gears and respective carriers upon which said sets of planet gears are journalled, said carrier of the secondary unit being connected for rotation with the driven shaft and the carrier of the primary unit being formed integrally with the sun gear of the secondary unit, and an overrunning clutch comprising a driving element upon the upper end of the drive shaft and a driven element journalled upon said driven shaft bearing portion and formed integrally with the primary unit sun gear.

3. In a lightweight aircraft drive gearing, a casing made of a relatively light metal and having upper and lower sections disposable axially together into assembly, the lowermost of said sections having a drive shaft bearing opening and the upper of said sections having a driven shaft bearing opening, drive and driven shafts extending into the casing respectively through said openings and having inner ends in piloted relation with one another, planetary gear means connected between and for transmitting driving force between said shafts, said planetary gear means including a ring gear secured to the casing, and means for securing said ring gear to the casing comprising an abutment means upon one of said casing sections engageable with an end of said ring gear, a fastening portion extending axially from the other end of said ring gear adjacently to the casing and fastening means extending through said fastening portion and said casing for retaining the ring gear against said shoulder and for holding said gear against rotation relatively to the casing.

4. In a lightweight aircraft drive gearing, a casing made of a relatively light metal and having upper and lower sections disposable axially together into assembly, the lowermost of said sections having a drive shaft bearing opening and the upper of said sections having a driven shaft bearing opening, drive and driven shafts extending into the casing respectively through said openings and having inner ends in piloted relation with one another, planetary gear means connected between and for transmitting driving force between said shafts, said planetary gear means including axially spaced ring gears secured to the casing, and means for securing said ring gears to the casing comprising opposed seating means respectively upon said casing sections for respective engagement by the outer and opposite ends of said ring gears, fastening portions extending axially from the opposed inner ends of said ring gears adjacently to the casing, and fastening means extending through said fastening portions and said casing for retaining said ring gears against their respective shoulders and for holding said ring gears against rotation relatively to the casing.

5. The combination set forth in claim 4 and wherein said fastening portions consist of notched bosses extending axially from the inner ends of said ring gears, wherein the bosses on each gear register with respective bosses on the other, and wherein said bosses have notches opening endwise from their respective gears and cooperable with the notches in the respectively opposed bosses to form openings for the reception of fastening means common thereto and for extending therethrough and through the casing for retaining the ring gears against said shoulders and for holding said gears against rotation relatively to the casing.

6. In a lightweight aircraft drive gearing, a casing made of a relatively light metal and having upper and lower sections disposable axially together into assembly, the lowermost of said sections having a drive shaft bearing opening and the upper of said sections having a driven shaft bearing opening, drive and driven shafts extending into the casing respectively through said openings and having inner ends in piloted relation with one another, planetary gear means connected between and for transmitting driving force between said shafts, said planetary gear means including a ring gear secured to the casing, and means for securing said ring gear to the casing comprising a flange projecting radially from said gear between said casing sections and fastening means extending mutually through said casing sections and said flange for holding said casing sections in said ring gear in assembly and for preventing rotation of said ring gear relatively to the casing.

7. In a lightweight aircraft drive gearing, a casing made of a relatively light metal and having upper and lower sections disposable axially together into assembly, the lowermost of said sections having a drive shaft bearing opening and the upper of said sections having a driven shaft bearing opening, drive and driven shafts extending into the casing respectively through said openings and having inner ends in piloted relation with one another, planetary gear means connected between and for transmitting driving force between said shafts, said planetary gear means including a ring gear secured to the casing, and means for securing said ring gear to the casing comprising an annular seat for said ring gear in one of said casing sections, said seat being engageable with an end of said gear, axially extending bosses upon the other end of said gear, an interiorly notched annular member, said annular member being disposable between the casing sections with its notched inner periphery meshed with the bosses on said ring gear to prevent rotation thereof, and with a portion of said annular member bearing against said other end of the gear for holding its one end against said seat, and fastening means extending through said casing sections and said annular member for holding said sections and member in rigid assembly.

8. In combination, coaxial relatively rotatable shafts, one of said shafts having an end recess in which an end of the other shaft is disposed, said other shaft having an outlet duct leading axially thereinto from said end thereof, and a gear pump between said shafts, comprising a casing rotatively fixed in the recess of the one shaft, said casing having a cylindrical bearing wall disposed with its axis in eccentric parallelism with the shaft axes, an internally lobed pump rotor gear journalled in said cylindrical bearing wall, a lobed pinion gear disposed within the rotor gear coaxially with said shafts and constrained for rotation with said other shafts, said pinion gear being of a diameter to mesh with the rotor gear at one side thereof and to dispose lobes thereof diametrically opposite to those meshed with the rotor gear in sealing wiping relation with lobes of the rotor gear at substantially its diametrically opposite side to form pockets between the lobes of said gears upon opposite sides of a median line passing through said sides of the rotor gear, said casing having end walls respectively in sliding sealing relation with the ends of said gears, outlet duct means in said casing communicating between one of said pockets and the outlet duct in said other shaft, and inlet duct means in said casing communicating between the other of said pockets and the recess in the one shaft, and said one shaft also having an inlet duct communicating with its recess, a pressure relief duct in said casing between said outlet duct therein and the one shaft recess, and a pressure relief valve comprising a spring-pressed element in said pressure relief duct, a spring chamber projecting axially from an end of the casing into said recess of the one shaft, and a spring in said spring chamber for pressing said spring-pressed element.

9. In a helicopter drive gearing, a gear casing having a lower drive shaft bearing and an upper driven shaft bearing axially aligned with the drive shaft bearing, a drive shaft journalled in said drive shaft bearing, a driven shaft journalled in the driven shaft bearing and extending downwardly into piloted relation with the drive shaft, said driven shaft having a rotatable-part receiving bearing portion within said casing between the driven shaft bearing and the drive shaft, and means for establishing a driving connection between said shafts comprising gearing including a pair of planetary gear units disposed in superposed relation about said driven shaft bearing portion, the lower of said units constituting a primary unit and the upper thereof a secondary unit, said units comprising respective sun gears journalled on the driven shaft bearing portion, respective ring gears fixed to the casing, respective sets of planet gears meshed with their associated sun and ring gears and respective carriers upon which said sets of planet gears are journalled, said carrier of the secondary unit being connected for rotation with the driven shaft and the carrier of the primary unit being rotatively fixed with the sun gear of the secondary unit, and an overrunning clutch comprising a driving element upon the upper end of the drive shaft and a driven element journalled upon said driven shaft bearing portion and constrained for rotation with the primary unit sun gear.

10. In a drive gearing unit for a helicopter having a body portion and a supporting rotor, the combination of coaxial upper and lower shafts, said upper shaft being adapted for connection with the supporting rotor and having an enlarged splined portion, two stage planetary gearing forming a driving connection between said shafts, said gearing including an upper planet carrier having a hub mounted on said splined portion, a thrust bearing mounted on said shaft above said hub and confining said hub against upward movement, a housing for said gearing supported upon said thrust bearing and adapted to transmit the weight of the helicopter body portion to said thrust bearing, a thrust bearing by means of which the lower end of said lower shaft is journaled in the lower portion of said housing, said planetary gearing including an upper sun gear and a lower planet carrier supported by the upper end of said lower shaft for rotation, a sun gear coaxial with and driven from the upper end of said lower shaft, and ring gear means carried by the housing.

11. The combination set forth in claim 1, wherein the drive shaft has a bell-shaped upper end portion forming a driving element of said overrunning clutch, and wherein the driven element of said overrunning clutch is journalled upon said bearing portion of the driven shaft and formed integrally with said sun gear.

OSCAR H. BANKER.

REFERENCES CITED

The following references are of record in the file of this patent:

UNITED STATES PATENTS

| Number | Name | Date |
| --- | --- | --- |
| 733,600 | Schneible | July 14, 1903 |
| 986,588 | O'Kelly | Mar. 14, 1911 |
| 1,217,427 | Fast | Feb. 27, 1917 |
| 1,299,156 | Fast | Apr. 1, 1919 |
| 1,320,530 | Buehler | Nov. 4, 1919 |
| 1,497,050 | Wardwell | June 10, 1924 |
| 1,840,867 | Rayburn | Jan. 12, 1932 |
| 1,882,383 | Hallitt | Oct. 11, 1932 |
| 1,945,361 | Ball | Jan. 30, 1934 |
| 1,960,141 | D'Ascanio | May 22, 1934 |
| 1,960,512 | Roos | May 29, 1934 |
| 1,977,943 | Gianini | Oct. 23, 1934 |
| 2,041,796 | Stalker | May 26, 1936 |
| 2,053,919 | Pigott | Sept. 8, 1936 |
| 2,156,603 | Nardone | May 2, 1939 |
| 2,269,916 | Price | Jan. 13, 1942 |
| 2,271,640 | Heintz | Feb. 3, 1942 |
| 2,318,276 | Worthington | May 4, 1943 |

FOREIGN PATENTS

| Number | Country | Date |
| --- | --- | --- |
| 476,561 | France | May 18, 1915 |